United States Patent [19]

Baker et al.

[11] Patent Number: 4,918,368
[45] Date of Patent: * Apr. 17, 1990

[54] SYSTEM FOR CHARGING BATTERIES AND MEASURING CAPACITIES AND EFFICIENCIES THEREOF

[75] Inventors: William Baker, Indianapolis; James C. Stevens, Plainfield; Phong B. Chau, Indianapolis, all of Ind.

[73] Assignee: Span, Inc., Indianapolis, Ind.

[*] Notice: The portion of the term of this patent subsequent to May 24, 2005 has been disclaimed.

[21] Appl. No.: 162,219

[22] Filed: Feb. 29, 1988

Related U.S. Application Data

[62] Division of Ser. No. 925,832, Oct. 29, 1986, Pat. No. 4,746,854.

[51] Int. Cl.⁴ .................................................. H02J 7/04
[52] U.S. Cl. ....................................... 320/40; 320/20; 320/21; 320/22; 320/37
[58] Field of Search ........................ 320/20, 21, 22, 37, 320/40, 48

[56] References Cited

U.S. PATENT DOCUMENTS 4,558,281 12/1985 Codd et al. .......................... 320/48
4,746,854 5/1988 Baker et al. ......................... 320/40

Primary Examiner—Patrick R. Salce
Assistant Examiner—Kristine Peckman
Attorney, Agent, or Firm—Neuman, Williams, Anderson & Olson

[57] ABSTRACT

A battering charging system is controlled by a microprocessor to charge and discharge batteries while periodically effecting monitoring and control operations in which battery current data are registered to accumulate capacity data in a memory and to thereafter display such data which includes both charge and discharge capacity data. The system has different modes of operation which may be selected by a user, including a charge mode, a discharge mode and an autocycle mode. In the autocycle mode, efficiency rate data is computed and displayed.

14 Claims, 15 Drawing Sheets

SYSTEM FOR CHARGING BATTERIES AND MEASURING CAPACITIES AND EFFICIENCIES THEREOF

This application is a division of our prior copending parent application entitled "BATTERY CHARGING SYSTEM", U. S. Ser. No. 925,832, filed Oct. 29, 1986 now U.S. Pat. No. 4,746,854.

BACKGROUND OF THE INVENTION

1. Field of the Invention

This invention relates to a battery charging and testing system and more particularly to a system which provides accurate measurements of battery performance and condition while being also usable for rapid charging of batteries to full charge conditions, avoiding overcharging and otherwise insuring safe and reliable operation. The system is easy to operate and control and is highly versatile with various modes of operation including charge, discharge and autocycle modes and it is readily and economically manufacturable.

2. Backqround of the Prior Art

Many arrangements have been used or proposed, prior to the aforementioned parent application, for the charging of various types of batteries including nickel-cadmium (NIcad) batteries which are quite capable of being charged at a rapid rate but which are easily damaged or destroyed if a high charge current is continued after a full charge condition has been reached. Chargers are commercially available which include mechanical timers set by the users to terminate charging after a set elapsed time. If set too long, dangerous overcharging may result. If set too short, the battery will not be fully charged. Other prior art arrangements have circuits designed for automatic control of termination of charge. For example, the Kosmin U.S. Pat. No. 3,938,021 discloses an analog circuit in which a series connected diode and capacitor are connected to a resistive voltage divider which is connected across terminals of a constant charge current source, an amplifier being provided having a high impedance input connected across the diode and having an output for controlling a transistor amplifier to turn off charge current when the charge voltage drops to a value such that there is no voltage across the diode. This type of circuit may operate satisfactorily but is not completely reliable and may allow charging beyond the full charge condition so that damage to batteries may result, in the absence of operator intervention.

A handbook of the General Electric Company, entitled "NICKEL-CADMIUM BATTERY APPLICATION HANDBOOK", Third Edition, 1986, includes a section starting at page 3-60 which describes a cutoff of the charging operation at a usable value of voltage decrement which typically tields a termination of a fast-charge process at a point that is equivalent in battery stress to a TCO change of about 5 to 10 degrees C. It also describes a delay at elevated temperatures.

A number of other prior patents contain proposals for use of digital or microprocessor circuits in charging or monitoring of the charge of NIcad or other types of batteries. These patents include the Ehlers U.S. Pat. No. 3,786,343, the Long U.S. Pat. No. 3,794,905, the Melling et al U.S. Pat. No. 3,890,556, the Melling et al U.S. Pat. No. 3,936,718, the Brandwein et al U.S. Pat. No. 3,940,679, the Siekierski et al U.S. Pat. No. 4,118,661, the Nicholls U.S. Pat. No. 4,191,918, the DeLuca et al U.S. Pat. No. 4,238,721, the Aspinwall et al U.S. Pat. No. 4,385,269, the Saar et al U.S. Pat. No. 4,388,582, the Saar et al U.S. Pat. No. 4,392,101, the Bollinger U.S. Pat. No. 4,418,310, the Koenck U.S. Pat. No. 4,455,523 and the Taylor U.S. Pat. No. 4,549,127. In general, such proposals involve the use of circuits which are complex and expensive and would not produce optimum results in charging of NIcad batteries.

An important consideration relates to the criteria used for determining when a charging operation should be terminated. The criteria which are disclosed in the aforementioned patents include the peak voltage condition, an inflection point of the voltage curve prior to the peak voltage condition, responses of a battery at certain times after application of a charging pulse and values or changes of temperature or other conditions. Peak voltage is used in the system of the Kosmin patent, a voltage proportional to peak voltage being stored by a capacitor for use in deter-mining when the battery voltage has reached a peak and then dropped therebelow.

An attempt to use peak voltage as a criterion is also disclosed in the Siekierski et al patent, which describes the conversion of the battery voltage to digital data which is stored for comparison with new digital data developed later from conversion of the analog sum of the battery voltage and a predetermined reference increment which is introduced to avoid the effects of "jitter". The charge is terminated if the digital data derived from conversion of the analog sum are less than the stored data. In this system, the resolution of conversion, in volts per digital bit, must be greater than the value in volts of the predetermined reference increment which, in turn, must be greater than the magnitude of voltage variations or "jitter".

The Saar et al patents illustrate systems in which the inflection point is used as a criterion and the Taylor et al patent illustrates a system in which the criterion is the ratio of voltage differences developed in two periods following a charging pulse.

SUMMARY OF THE INVENTION

The inventions of this division application and that of the parent application were evolved with the general object of providing apparatus which is suitable for automatic,rapid, safe, reliable and efficient charging and discharging of batteries and which is easy to operate while being readily and economically manufacturable.

A particular object of the invention of this divisional application is to provide a system which provides highly useful and accurate information with respect to the condition and characteristics of batteries being charged or otherwise conditioned or tested.

This divisional application is particularly directed to testing operations in which data from periodic battery current measurements are accumulated in a manner such as to obtain accurate information regarding the capacity of a battery in energy units.

In accordance with a specific feature, such testing operations may be effected either in a charge mode of operation in which current flows from a power supply to a battery and in a discharge mode of operation in which current flows from a battery to a load. In the charge mode, a finding is made as to the capacity of the battery to receive energy. In the discharge mode, a finding is made as to the capacity of the battery to deliver energy to a load.

Another important feature relates to the provision of means for comparing measured charge and discharge capacities under appropriate conditions to determine the efficiency of the battery and its overall condition. Since the charge capacity represents the energy applied to the battery during the charge mode of operation and the discharge capacity represents the energy derived from the battery in the discharge mode of operation, the ratio of the discharge capacity to the charge capacity provides an accurate indication of efficiency.

The invention of this divisional application is not necessarily limited to use with a system as disclosed in detail in the aforementioned parent application, but one important advantage is that it is compatible with that system, particularly in that it is readily implemented with a microprocessor controlled system and is usable in various modes of operation including an autocycle mode in which charge and discharge operations are effected sequentially.

Although having other applications, the invention of this divisional application as well as that of the parent application are especially directed to charging and conditioning and testing of NIcad batteries of a relatively new class, capable of extremely rapid charge and discharge, with much higher currents than used previously and presenting special problems.

Important features relate to the use of digital and microprocessor circuitry for measurement and control and to the discovery and recognition of features of construction and operation of such circuitry to obtain optimum results. The system of the invention of the parent application has a number of important features and advantages including improved control of the charging operation and rapid charging of batteries without overcharge thereof, the inclusion of a controlled discharge operation and also an autocycle discharge-charge operation, accurate monitoring of operating conditions and automatic detection and avoidance of conditions which might cause malfunctions. The system is versatile and is readily operated while being highly reliable.

With regard to improved control of the charging operation, it is found that in rapid charging of NIcad batteries, it is very important that the charge be terminated at the proper time, before any excessive charging of and/or damage to a battery can occur. Investigations and tests show that the aforementioned peak detection technique has a number of advantages over other possible techniques, including its relative simplicity, and that highly satisfactory results can be obtained, provided that the technique is properly used. Certain special problems must be overcome.

Tests of NIcad batteries in rapid charge conditions show that the voltage tends to increase very slowly in approaching a peak and that it also tends to decrease very slowly after a peak is reached, making it difficult to detect the exact magnitude of the peak and establish the time at which it occurs. However, it is also found to be very important that a fast charge operation be terminated within a short time after the peak is reached, no more than a few seconds at most. It is thus quite important that the voltage measurements be made precisely and accurately, with very high sensitivity. However, when highly sensitive means are used in an attempt to detect a peak condition and a subsequent very gradual drop, stability problems are introduced. In particular, in a system which used a microprocessor and in which the battery voltage is converted to digital data, sensitivity or resolution may be expressed or measured in terms of the voltage increment required to produce a change of one bit in the digital data. It is found that when the resolution is high, i.e. when the voltage increment per digital bit is very low, it is difficult to obtain stable operation for the reason that transient voltage variations may oftentimes be from more than two to several times the voltage increment per bit of the conversion operation. As a result and because the rate of increase of voltage is very low when approaching a peak, transient voltage variations may cause the charge to be terminated prematurely, long before the full charge condition is reached.

In accordance with the invention of the parent application, these problems are overcome by introducing digital data which defines a threshold value and discontinuing the fast charge when current voltage is less than a stored peak voltage and when, in addition, the difference in corresponding digital data is greater than the threshold data. This arrangement is highly stable and reliable in operation. At the same time, it achieves high resolution measurement, precise and accurate detection and storage of the peak condition and accurate detection of a drop from the peak condition, so as to insure that the fast charge is discontinued within a very short time after the peak condition is reached.

In an illustrated embodiment, the battery voltage is converted to digital data with a resolution of about 9 mV per counter bit and a digital threshold value of 8 bits is used. Testing and control operations are performed periodically, at about 1 second intervals, for example. During each such operation, the current battery voltage digital data are entered into an accumulator or working register of a microprocessor and are compared with maximum value data stored in memory. The maximum value data are replaced by the new data when and only when the new data are greater. If the new data are less than the stored data, the difference is compared with the digital threshold value and if the difference is greater, application of a high charging current is discontinued. In the apparatus of the illustrated embodiment, the digital threshold value of 8 bits is found to be of sufficient magnitude to avoid premature shut-downs which might otherwise be caused by transient supply voltage variations and the like. At the same time, the conversion resolution of 9 mV per bit allows highly accurate detection of the peak voltage value and early detection of a slowly decreasing voltage after the peak condition is reached. It will be understood, of course, that such threshold and resolution values are given as examples and are not to be construed as limitations.

Thus, the charge control operation of the invention of the parent application combines high resolution tracking of the battery voltage and continual and accurate updating of stored peak data with control being effected from a digital comparison of a digital threshold value and the difference between current and stored data, the resolution and the digital threshold value being such as to obtain optimum results.

In accordance with another feature of the invention of the parent application, the system is operable in a pre-charge mode in which a relatively low charge current is applied. When the voltage at the battery terminals fails to increase at least a certain rate, the charge operation is discontinued and, preferably, an indication is provided that the battery is not capable of receiving a proper charge. Otherwise, the normal fast charge mode of operation is initiated, a high charge current being supplied to the battery terminals.

Further features of the invention of the parent application relate to the inclusion of a discharge operation in which a load is connected to the battery terminals to draw current from the battery, the load preferably including a transistor or other controllable device for control of the discharge current. The discharge operation is continued until a predetermined discharge condition is reached, preferably a condition in which the voltage at the battery terminals decreases at a rate exceeding a certain threshold value. Specific features relate to a further definition of the discharge condition as one in which the voltage is decreasing at a rate greater than a certain threshold value.

The inclusion of the discharge operation is highly advantageous in that a battery may be readily restored to full capacity by cycling it one or more times between full discharge and full charge. It is further advantageous in connection with the invention of this divisional application in that it permits computation of the capacity and efficiency of a battery through a determination of the energy delivered by the battery during a discharge operation, the energy supplied to the battery during a charge operation and the ratio of such energies. In accordance with the invention, the microprocessor is usable in connection with voltage-current monitoring circuitry and with a time measurement to compute the values of energies supplied and delivered and the ratio thereof. It is noted that since fixed criteria are used for terminating the discharge and charge operations, the computed battery capacities and efficiencies provide reliable standards for comparing the performances of batteries and for determining whether a battery being tested is suitable for a particular purpose or whether it should be replaced.

Another feature of the invention of the parent application as well as of the invention of this divisional application is in the provision of an autocycle mode for unattended cycling of a battery through a discharge operation followed by a charge operation. The autocycle mode is particularly advantageous in that it is compatible with and facilitates the capacity and efficiency measuring operations to which the invention of this divisional application is directed.

Additional features of the system relate to the control of current to maintain current at a certain value which is preferably one of several values selected by the operator. Common circuitry is used in controlling both charge and discharge current, such circuitry including a resistance ladder network controlled by the microprocessor. Also, the same monitoring circuitry as used for measurement of the battery voltage is used for measurement of current, being connected to a resistor which is in series with the battery.

Additional important features relate to the making of voltage measurements, using a microprocessor, a real time counter and a VCO (voltage controlled oscillator). The VCO is operable to develop a cyclic output signal having a frequency or period proportional to the magnitude of a control voltage applied thereto and the microprocessor registers data corresponding to the number of counts which are registered by the real time counter during a predetermined integer number of cycles of the VCO output signal. The VCO is operable in a relatively low frequency range and the cost of providing the VCO and the counter is relatively low. In an illustrated embodiment, a commercially available microprocessor is used of a type which includes a real time counter on the same chip, operable from the same clock signals used for operation of the microprocessor. At the same time, highly accurate measurements are obtained, with a high degree of reliability.

Specific features of the invention of the parent application are compatible with the invention of this divisional application. These relate to the use of a real time counter of limited count capacity while at the same time obtaining very high resolution and accuracy and without using special integrated circuits or expensive components. One feature relates to the relationship between the count capacity of the real time counter, the number of VCO cycles during which a measurement operation is performed, the range of duration of the VCO cycles and the frequency of clock pulses applied to the real time counter. The relationship is preferably such that the range of duration of the measurement interval corresponds to the time required to produce a full count of the real time counter. With this relationship, the resolution of measurement may be maximized and, at the same time, the VCO may be operated in an optimum range from the standpoint of linearity and stability. Also, an available clock signal source for the real time counter, such as that provided by the microprocessor, may be used.

Another specific feature relates to the attainment of a count offset such that the range of registered data has a minimum value close to a zero value when the VCO cycle duration is at a minimum while having a maximum value close to the count capacity of the real time counter when the VCO cycle duration is at a maximum. The count offset may be readily obtained by pre-loading the real time counter with a predetermined count at the beginning of a measurement cycle.

Another important specific feature is in the use of a comparator to apply a voltage to the VCO, or to other analog to digital conversion means, which is proportional to the difference between an offset voltage and a voltage which is proportional to the input control voltage. Preferably, the offset voltage is controllable by the microprocessor in steps to divide the total range of voltages which may be measured into a number of adjacent ranges. In this way, each registered count or digital bit corresponds to a certain incremental voltage throughout the measurement range and a very high resolution is obtained. The voltage offset is readily obtained using an inexpensive resistance ladder network.

Still further features of the inventions relate to ease of control of the various possible operational modes of the system and to the detection of conditions which might lead to a malfunction, to avoid damage to the circuitry or to a battery being charged or discharged. Also, a meter is provided having a scale such as to indicate the condition of charge of batteries having various different numbers of cells and to indicate the existence of a shorted cell.

These and other objects, features and advantages will become more fully apparent from the following detailed description taken in conjunction with the accompanying drawings.

DESCRIPTION OF A PREFERRED EMBODIMENT

Figure 1:
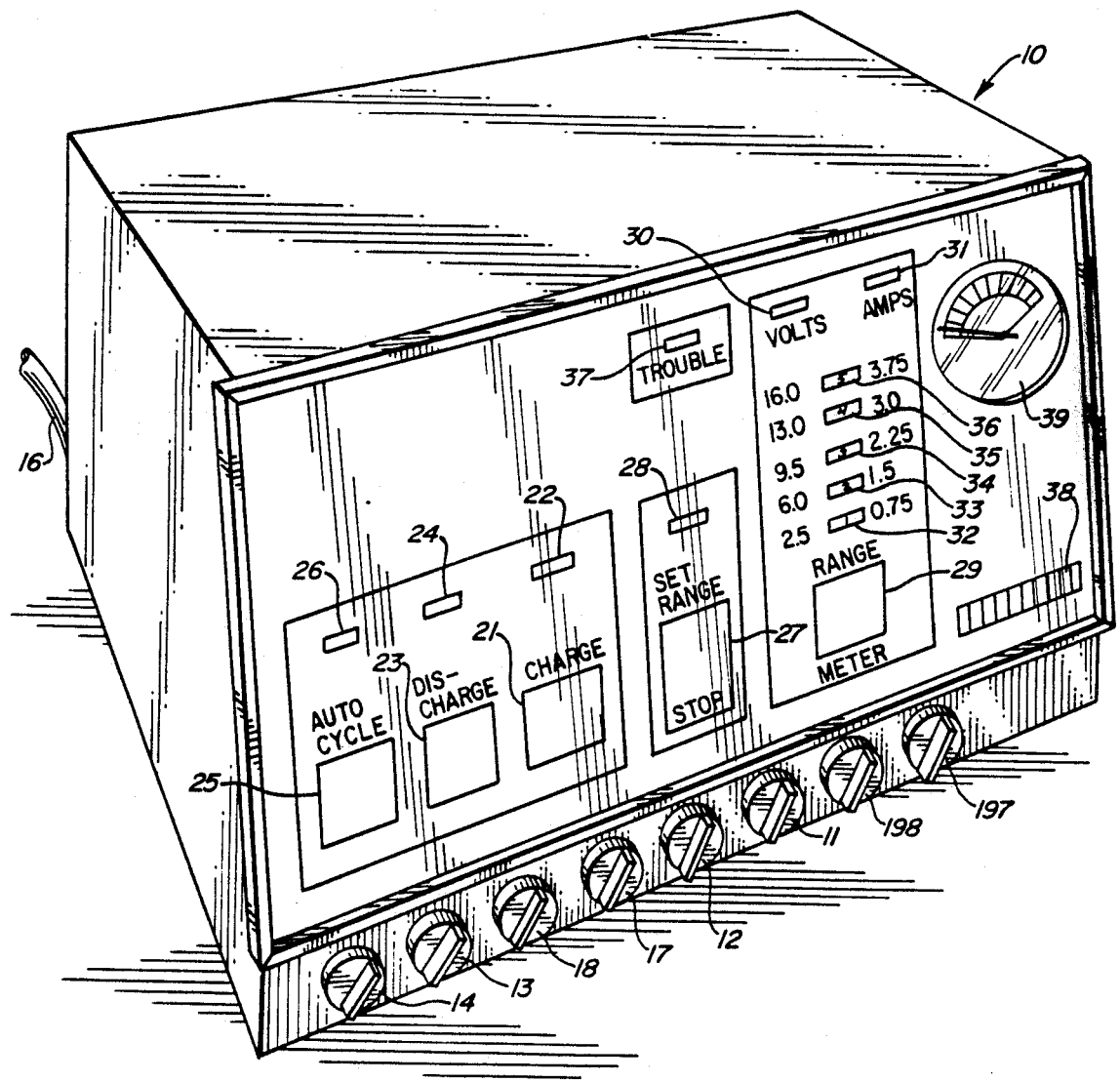
FIG. 1 is a perspective view of a charger unit which is constructed in accordance with the invention.

Reference numeral 10 generally designates a charger unit constructed in accordance with the principles of the invention. The illustrated unit 10 includes a pair of terminals 11 and 12 for connection to a single cell or battery to be charged or for connection to a plurality of cells or batteries in series. The unit may be supplied with power from a battery or other DC source connected to a pair of terminals 13 and 14 or through connection of a line cord 16 to a standard 120 volt 60 Hz source. A pair of terminals 17 and 18 are provided for connection to an external ammeter, such terminals being connected by a jumper when no external meter is used.

A control panel 20 is provided which includes a "CHARGE" key 21 and an associated signal light 22, a "DISCHARGE" key 23 and an associated signal light 24, an "AUTOCYCLE" key 25 and an associated light signal 26, a "SET" key 27 and an associated signal light 28 and a "METER" key 29 and associated "VOLTS" and "AMPS" lights 30 and 31. A series of five lights 32-36 are provided to indicate levels or ranges of operation and a trouble or error light 37 is also provided.

In addition, a digital display 38 is provided for indicating voltage or current, as well as for indicating charge and discharge capacities and battery efficiency in accordance with the invention of this divisional application. Such capacities and battery efficiency are determined using operations as defined in flow diagrams of FIGS. 12-15, showing modifications of operations as shown in other flow diagrams.

A meter 39 is provided for indicating the condition of charge of any battery which has from one to a certain number of cells, the meter 39 being usable for up to 10 cells in the illustrated embodiment.

In a typical operation of the unit, a battery is connected to the unit and power is supplied thereto. The SET key 27 is usable to select one of five current settings by successive closures, indicated by the vertical column of lights 32-36. Initially, the system is in a default condition at the lowest current setting, indicated by the lower-most light 32. After reaching the highest current setting, indicated by light 36, an additional closure of the SET key 27 returns the selection to the lowest setting. The selected setting dictates the current level for either a charge operation or a discharge operation.

When the CHARGE key 21 is pressed, the light 22 is energized and a charging operation is initiated. The system initially operates in a pre-charge mode in which a low charge current is supplied to the battery to test the battery and to determine whether the charge voltage increases as it should if the battery is in generally good condition.

If an increasing voltage does not result after several attempts, the charge operation is aborted and the trouble or error light 37 is energized to alert the user that the battery was left uncharged and may be faulty.

A normal charge operation will cause application of a high charge current and will proceed until the charge voltage reaches its peak value whereupon charging is terminated. The light 22 is then deenergized and the SET light 28 is energized to show that the system is ready for a new operation.

The trouble or error light 37 may also be energized and a charge operation may be aborted in response to excessive temperature of the battery when a temperature sensor is mounted on the battery and connected to terminals forming a sensor port on the back of the unit. The same result may be produced by any input of an improper electrical nature to the sensor port, e.g. a manual switch to ground.

When the CHARGE key 21 has been pressed and the system is in the CHARGE mode, the vertical column of lights 32-36 are usable for other purposes. At this time, closure of the METER key 29 causes meter to cycle through three modes: VOLTS, AMPS and SET as indicated by lights 30, 31 and 28. In the AMPS mode, the range of charge current that the battery is presently receiving is indicated by one of the lights 32-36 and the actual reading is indicated by the display 38. Similarly, in the VOLTS mode, the charge voltage range is indicated by one of the lights 32-36 and the voltage is indicated by the display 38. In the SET mode, the energized light indicates which current range was selected.

If the SET key 21 is depressed while in the charge mode, or while it is in the discharge mode as hereinafter described, the system returns immediately to the SET mode and current flow to or from the battery is stopped.

When the DISCHARGE key 23 is pressed, the lamp 24 is energized and a discharge operation is initiated. Prior thereto, the user may select the discharge current setting to be used, in the same manner as in the charge operation, by using the SET key 27 and observing which of the lights 32-36 is energized. When the discharge operation is initiated, the unit draws the set current from the battery and continues to do so until the terminal voltage begins to drop sharply to signal a full discharge. Then the discharge is terminated, the SET light 28 being then deenergized.

Another mode of operation provides for unattended cycling of a battery through a discharge operation followed by a charge operation. This AUTOCYCLE mode is selected by pressing the AUTOCYCLE key 25, the light 26 being then energized. The battery is then discharged until a predetermined condition is reached and thereafter charged to the full charge condition. At all times, the battery is monitored and if abnormal characteristics are identified, the operation is aborted and the trouble or error light 37 is energized. Normally, the battery will be left fully recharged and at full restored capacity, after using the AUTOCYCLE mode.

Figure 2:
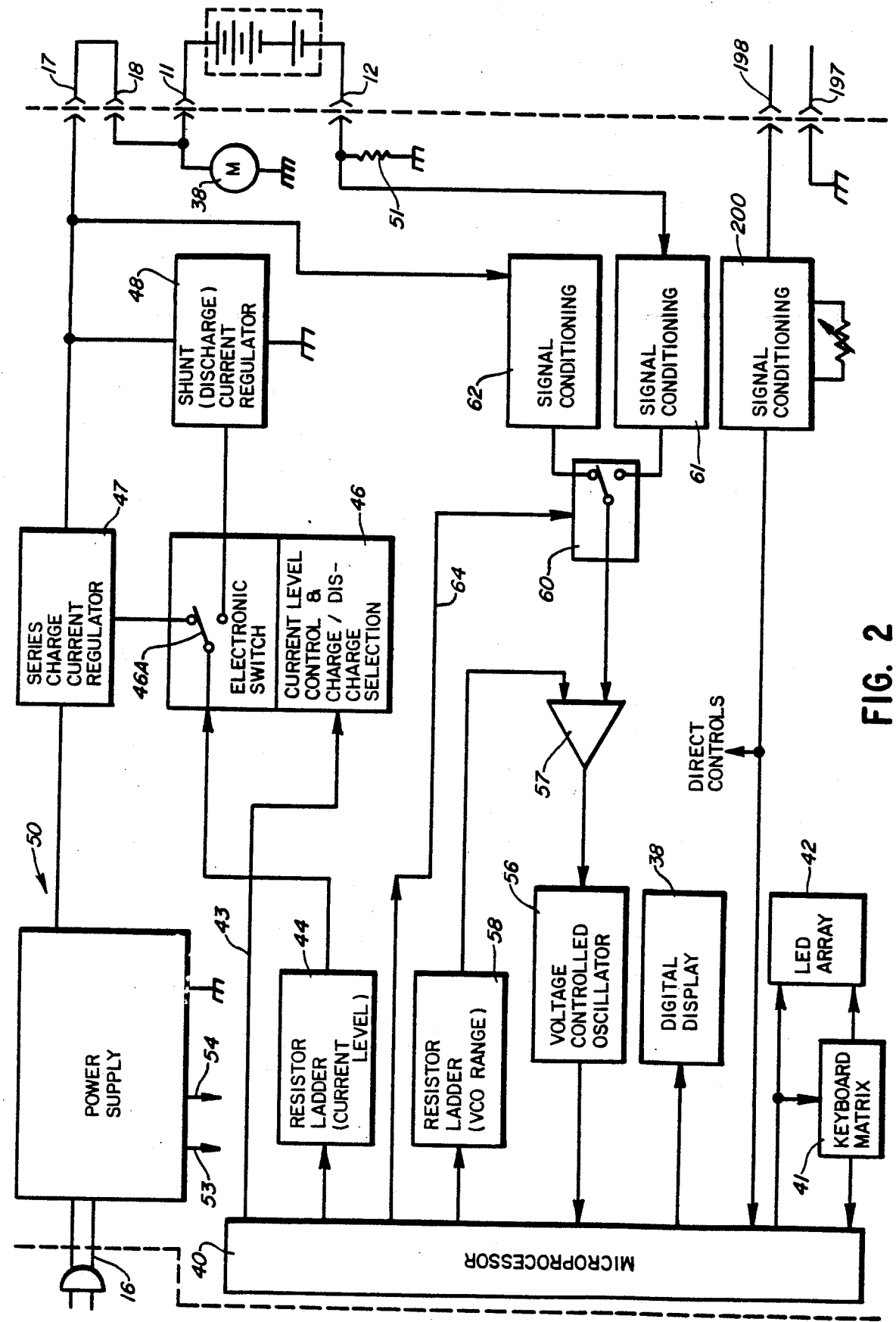
FIG. 2 is a functional block diagram of circuitry of the charger unit of FIG. 1.

FIG. 2 is a functional block diagram of circuitry of the charger unit. A microprocessor 40 is provided which is connected to a keyboard matrix 41, for monitoring of the actions of the various keys, and to a LED (light-emitting-diode) array 42 for energization of the various signal lights. Microprocessor 40 is also connected through a charge/discharge select line 43 and through a resistor ladder 44 to a charge/discharge selection and current level control circuit 46. The resistor ladder circuit 44 supplies a signal at a certain level which is determined by the current setting selected through operation of the set key 27 and indicated by one of the lights 32–36. As diagrammatically illustrated, this signal is applied through an electronic switch 46A of the circuitry 46, either to a charge current regulator 47 or a discharge current regulator 48. The charge current regulator 47 is connected in series between power supply circuitry 50 and ammeter terminal 17 which may be connected through an external ammeter or through a jumper as shown to the terminal 18 which is connected to the battery terminal 11. The other battery terminal 12 is connected through a current sensing resistor 51 to ground. The discharge current regulator 48 is connected in shunt relation to the battery, being connected to the terminal 17 and to ground. As indicated, the power supply circuitry is connected to ground and also to the external DC supply terminal 13, the terminal 14 being connected to ground. Power supply 50 is also connected to the line cord 16 for connection to a standard 120 volt 60 Hz source and it is arranged to supply +5 volt and +8 volt regulated voltages on lines 53 and 54 for operation of the microprocessor 40 and for operation of certain linear circuits as hereinafter described.

The voltage across the current sense resistor 51 and the battery voltage are monitored through an arrangement which includes a VCO (voltage-controlled oscillator) 56 which is connected to the output of a VCO ranging amplifier 57, one input of amplifier 57 being connected to the output of a resistor ladder 58 which is connected to the processor 40. As diagrammatically illustrated, a second input of the VCO ranging amplifier 57 is connected through an electronic switch circuit 60, either to the output of a signal conditioning circuit 61 which is connected to the current sense resistor 51 or to the output of a signal conditioning circuit 62 which is connected to the terminal 17. The electronic switch circuit 60 is controlled from the microprocessor through a line 64 to continually switch between the two signal conditioning circuits 61 and 62 and to apply a voltage to the VCO ranging amplifier which is proportional either to the battery current or the battery voltage. As hereinafter described, the microprocessor 40 includes an internal real time counter operated in conjunction with the VCO 56 to effect registration of digital data which corresponds to the analog voltage applied to the VCO ranging amplifier 57 from the switch 60. The resistor ladder 58 is controlled by the microprocessor 40 to supply an offset voltage such that the effective range of voltage applied to the VCO 56 is limited with the total voltage-measurement range being divided into a number of adjacent ranges. The result is that high resolution is obtained over a wide voltage range using available and relatively inexpensive circuitry.

As also illustrated in the functional block diagram of FIG. 2, the microprocessor 40 is connected to the digital display 38.

Figure 3:
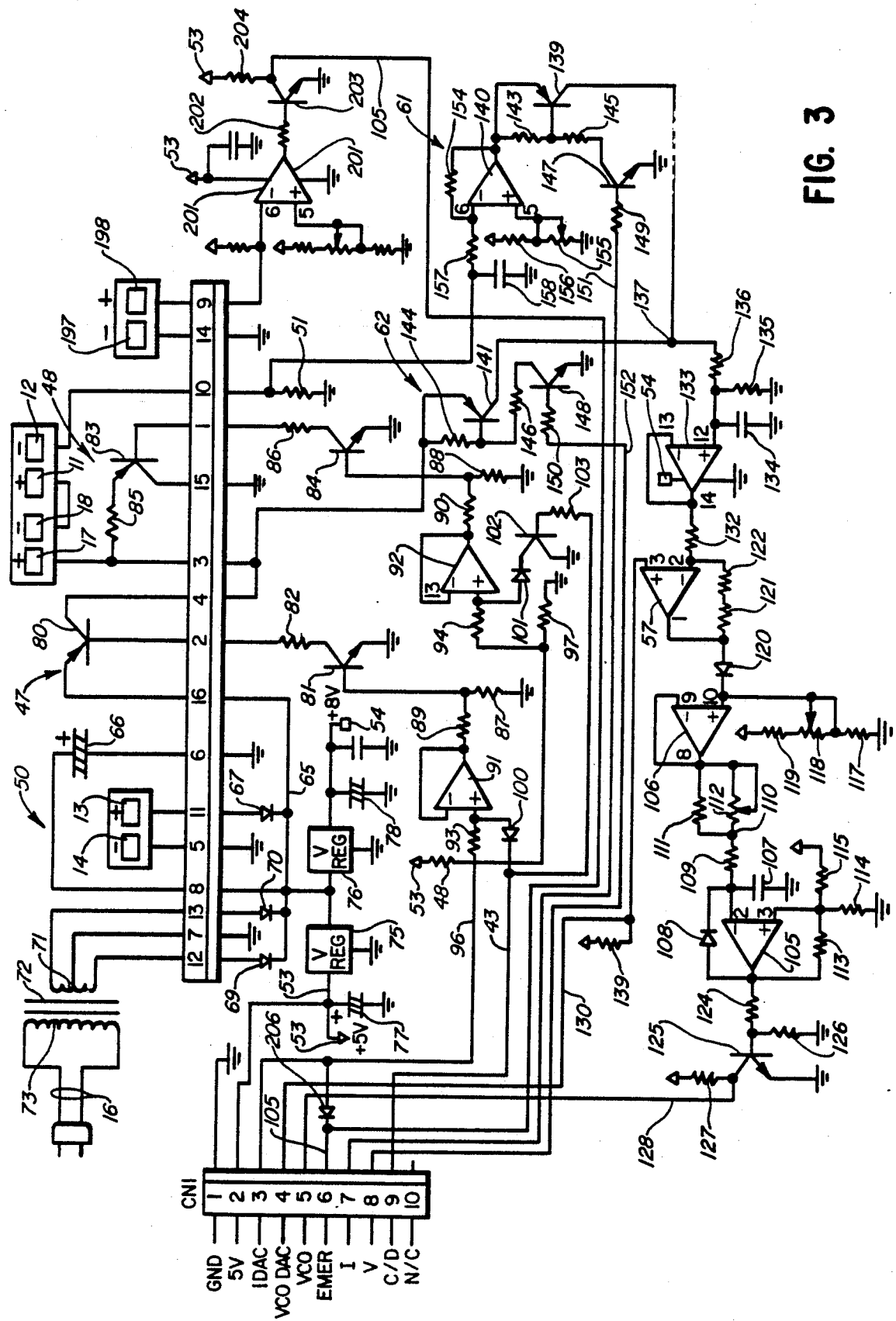
FIG. 3 is a schematic diagram of linear circuits of the circuits shown in block form in FIG. 2.

FIG. 3 is a schematic diagram of linear circuitry of the unit. The power supply circuitry 50 includes an output bus 65 which is connected through a capacitor 66 to ground. It is also connected through a blocking diode 67 to the battery terminal 13 and through a pair of rectifying diodes 69 and 70 to opposite ends of a secondary winding 71 of a transformer 72 which has a primary winding 73 connected to the line cord 16, the secondary winding 71 having a center tap connected to ground. The bus 65 is also connected to inputs of two voltage regulators 75 and 76 which develop the +5 and +8 volt regulated voltages on the lines 53 and 54, line 53 being connected through a capacitor 77 to ground and line 54 being connected through capacitors 78 and 79 to ground.

The output bus 65 is connected to the emitter of a transistor 80 which has a collector connected to the terminal 17 and which cooperates with a control transistor 81 to form the charge current regulator 47. The collector of transistor 81 is connected through a resistor to the base of the transistor 80 and its emitter is connected to ground. The shunt current regulator 48 is formed by a resistor 83 and a cooperating control transistor 84. The emitter of transistor 83 is connected through a resistor 85 to the terminal 17 and its collector is connected to ground with the base thereof being connected through a resistor 86 to the collector of transistor 84 and with the collector of transistor 84 being connected to ground. During charge operation, a positive voltage is applied to the base of the transistor 81 to obtain a controlled current flow through the series transistor 80. Similarly, during the discharge operation, a positive voltage is applied to transistor 84 to obtain a controlled current flow through the shunt transistor 83.

The bases of transistors 81 and 84 are respectively connected through resistors 87 and 88 to ground and through resistors 89 and 90 to the outputs of two operational amplifiers 91 and 92, the minus inputs of amplifiers 91 and 92 being connected directly to the outputs thereof. The plus inputs of amplifiers 91 and 92 are connected through resistors 93 and 94 to a control line 96 which is connected through a resistor 97 to ground and through a resistor 98 to the +5 volt power supply line 53. The plus input of amplifier 91 is also connected through a diode 100 to the charge/discharge select line 43 while the plus input of amplifier 92 is connected through a diode 101 to the collector of a transistor 102 which has a grounded emitter and which has a base connected through a resistor 103 to the charge/discharge select line 43. When the line 43 is at a high level, the diode 100 is non-conductive and the amplifier 91 is operative to apply a positive control voltage to the control transistor 81. At the same time, the transistor 102 is rendered conductive to render the diode 101 conductive and to preclude operation of the amplifier 96. When the line 43 is brought low, the operation is reversed, the amplifier 91 being inoperative and the amplifier 92 being effective to control the flow of current through the shunt regulator transistor 83. Thus, the switching action as diagrammatically indicated by switch 46A is obtained.

The voltage controlled oscillator 56 includes two operational amplifiers 105 and 106. The minus input of amplifier 105 is connected through a capacitor 107 to ground, through a diode 108 to its output terminal and through a resistor 109 to a circuit point 110 which is connected through a fixed resistor 111 and a parallel adjustable resistor 112 to the output of amplifier 106, the output of amplifier 106 being connected to its minus input. The plus input of amplifier 105 is connected through a resistor 113 to its output, through a resistor 114 to ground and through a resistor 115 to the power supply line 53. The plus input of amplifier 106 is connected through a resistor 117 to ground and through an adjustable resistor 118 and a fixed resistor 119 to the power supply line 53. Also, the plus input of amplifier 106 is connected through a diode 120 to the output of an operational amplifier which forms the VCO ranging amplifier 57 shown in FIG. 2, the output of amplifier of 57 being connected through a pair of resistors 121 and 122 to its negative input. The VCO formed by the operational amplifiers 105 and 106 and associated circuit components is operative over a frequency range which is controlled by adjustment of the resistors 112 and 118, the resistor 112 being effective to provide a high stop adjustment and the resistor 118 being effective to provide a low stop adjustment. The output of the VCO, developed at the output of the amplifier 105 is applied through a resistor 124 to the base of a transistor 125 which operates as a buffering and inverting stage. Its base is connected through a resistor 126 to ground, its emitter is connected directly to ground and its collector is connected through a resistor 127 to the line 53 and also to an output line 128 which is connected to the microprocessor 40.

Figure 4:
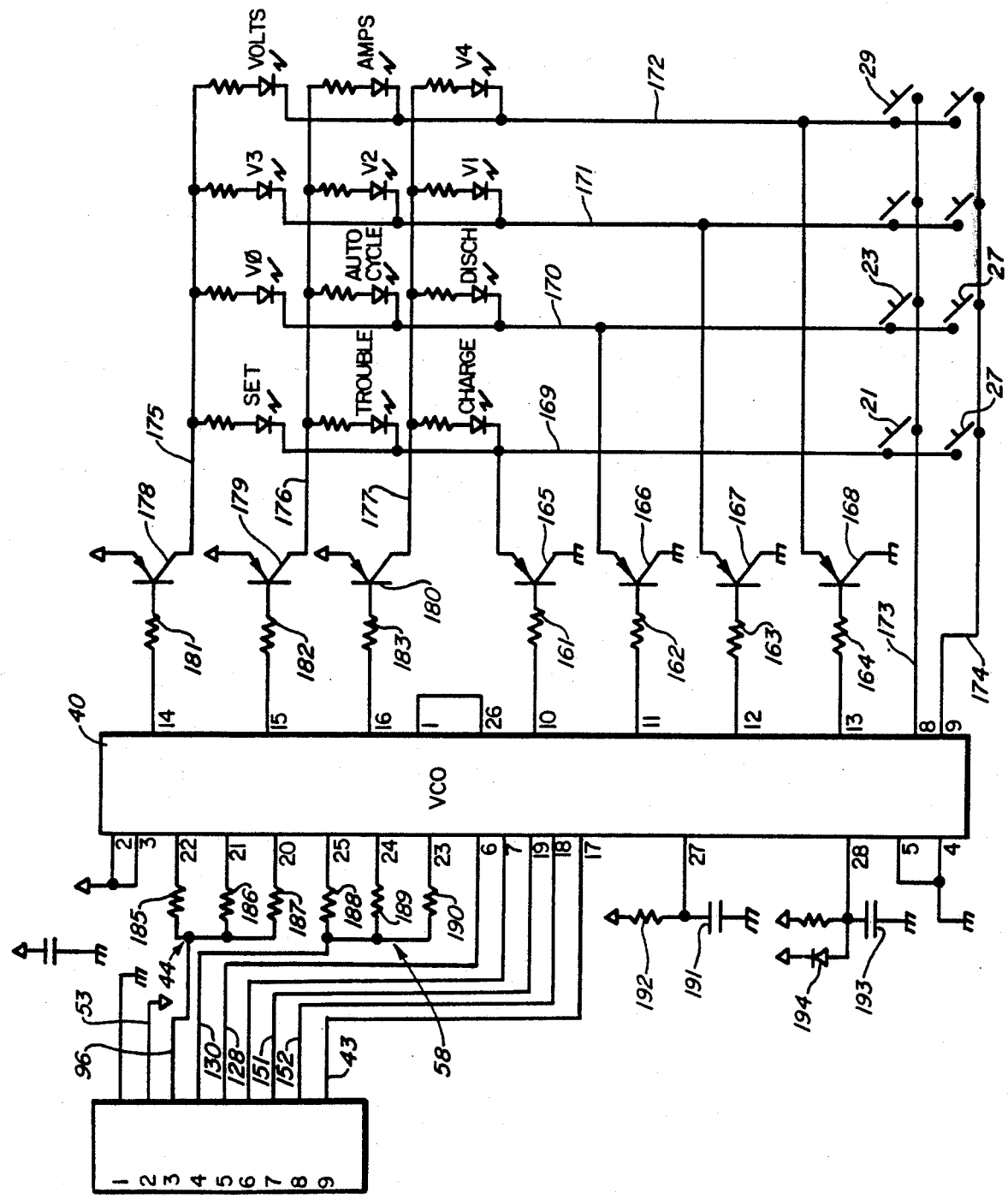
FIG. 4 is a schematic diagram of digital circuitry shown in block form in FIG. 2.

The frequency of operation of the VCO, over its operative range, is substantially a linear function of the voltage applied to the plus input of amplifier 106 which, in turn, is a function of the difference in voltages applied to the plus and minus inputs of the VCO ranging amplifier 57. The plus input of the ranging amplifier 57 is connected through a resistor 129 to the line 53 and is also connected through a line 130 to the output of the resistor ladder 58 which is shown in FIG. 4 and which is described hereinafter. The minus input of amplifier 57 is connected through a resistor 132 to the output of an operational amplifier 133 which has a minus input connected to its output and which has a plus input connected through a resistor 134 and a parallel capacitor 135 to ground and also through a resistor 136 to a circuit point 137. A voltage is applied at circuit point 137 which is proportional either to the voltage across the current sense resistor 51 or to the battery voltage at terminal 17.

In the current sense operation, a transistor 139 is rendered conductive to connect the output of an operational amplifier 140 to circuit point 137, a negative input of amplifier 140 being connected to the current sense resistor 51. In the voltage sense operation, a transistor 141 is rendered conductive to connect circuit point 137 to the terminal 17.

To render transistors 139 and 141 conductive, the bases thereof are connected through resistors 143 and 144 to the emitters thereof and through resistors 145 and 146 to the collectors of transistors 147 and 148 which have grounded emitters and which have bases connected through resistors 149 and 150 to control lines 151 and 152 which are connected to output ports of the microprocessor 40.

The transistors 147 and 148 thus provide the functional equivalent of the signal select switch 60 shown diagrammatically in the functional block diagram of FIG. 2 and the transistor 139 together with the amplifier 140 forms the signal conditioning circuit 61 while the transistor 141 forms the signal conditioning circuit 62. The signal conditioning circuit 61 has additional components including a resistor 154 connected between the minus input of amplifier 140 and its output, an adjustable resistor 155 connected between the plus input of amplifier 140 and ground, a resistor 156 connected between the plus input of amplifier 140 and the line 53, a resistor 157 connected between the minus input of amplifier 140 and the current sense resistor, and a capacitor 158 connected across the current sense resistor 51.

The circuitry of FIG. 3 is connected to the microprocessor 40 and associated digital circuitry through connectors shown at the left side of FIG. 3 and at the left side of FIG. 4. As shown in FIG. 4, four output ports of the microprocessor 40 are connected through four resistors 161–164 to the bases of four transistors 165–168 which have grounded collectors and which have emitters collected to four column lines 169–172. A pair of input ports are connected to lines 173, contacts of the CHARGE key 21, DISCHARGE key 23 and METER or MODE key 29 being connected between line 173 and the column lines 169, 170 and 172 while contacts of the SET key 27 and the AUTOCYCLE key 25 are connected between line 174 and the column lines 169. By selective control of the output ports connected to resistors 162–164 and by sensing the signals on lines 173 and 174, the depression of one of the keys may be ascertained.

The lights 22, 24, 26, 28 and 30–37 are all in the form of light-emitting diodes which have cathodes connected to column lines 169–172 in the manner as shown and which have anodes connected through resistors to row lines 175, 176 and 177 which are connected to the collectors of transistors 178, 179 and 180, the bases of transistors 178, 179 and 180 being connected through resistors 181, 182 and 183 to output ports of the microprocessor 40. The current level resistor ladder 44 is formed by three resistors 185–187 which are connected between the line 96 and output ports of the microprocessor 40. Similarly, the VCO range resistor ladder 58 is formed by three resistors 188–190 which are connected between the line 130 and other output ports of the microprocessor 40. Additional output ports of the microprocessor are connected to the control lines 151 and 152 to control whether the monitored voltage is proportional to battery current or battery voltage and another output port is connected to the charge/discharge control line 43.

Another port of the microprocessor 40, operative as an input port, is connected to the output line 128 of the microprocessor 40.

As also shown in FIG. 4, an oscillator terminal of the microprocessor is connected through a capacitor 191 to ground and through a resistor 192 to the line 53. A reset terminal is connected through a capacitor 193 to ground and through a resistor 194 in parallel with a diode 195 to the line 53.

Provision is made for connecting the unit to a temperature sensor which may be physically mounted on or in proximity to a battery being charged or conditioned. Such a sensor may be connected to terminals 197 and 198 shown in FIGS. 1 and 3, terminal 197 being grounded and terminal 198 being connected to the input of a signal conditioning circuit generally designated by reference numeral 200. The circuit 200 includes an operational amplifier 201 and input circuitry similar to that of the operational amplifier 140 of the signal conditioning circuit 61. The output of amplifier 200 is connected through a resistor 202 to the base of a transistor 203 which has a grounded emitter and which has a collector connected through a resistor 204 to the line 53. The collector of transistor 203 is connected to a line 205 which is connected to an input port of the microprocessor 40 and which is also connected through a diode 206 to the line 96. When a sensor connected to terminals 197 and 198 applies a control signal, in response to an excessive temperature condition for example, the transistor 203 is rendered conductive to bring the line 205 to a low condition for detection by the microprocessor and also to bring the line 96 low and to prevent conduction of either charge or discharge current.

The microprocessor 40 of the illustrated embodiment is a General Instrument Type PIC1655A microcomputer which includes a real time clock counter and which has four input lines, eight output lines and, in addition, eight lines which are operative as either input or output lines under program control. Program listings for implementing operation of the system are set forth in the specification of the parent application and are herein incorporated by reference, FIGS. 5-11 being flow diagrams which correspond thereto.

Figure 5:
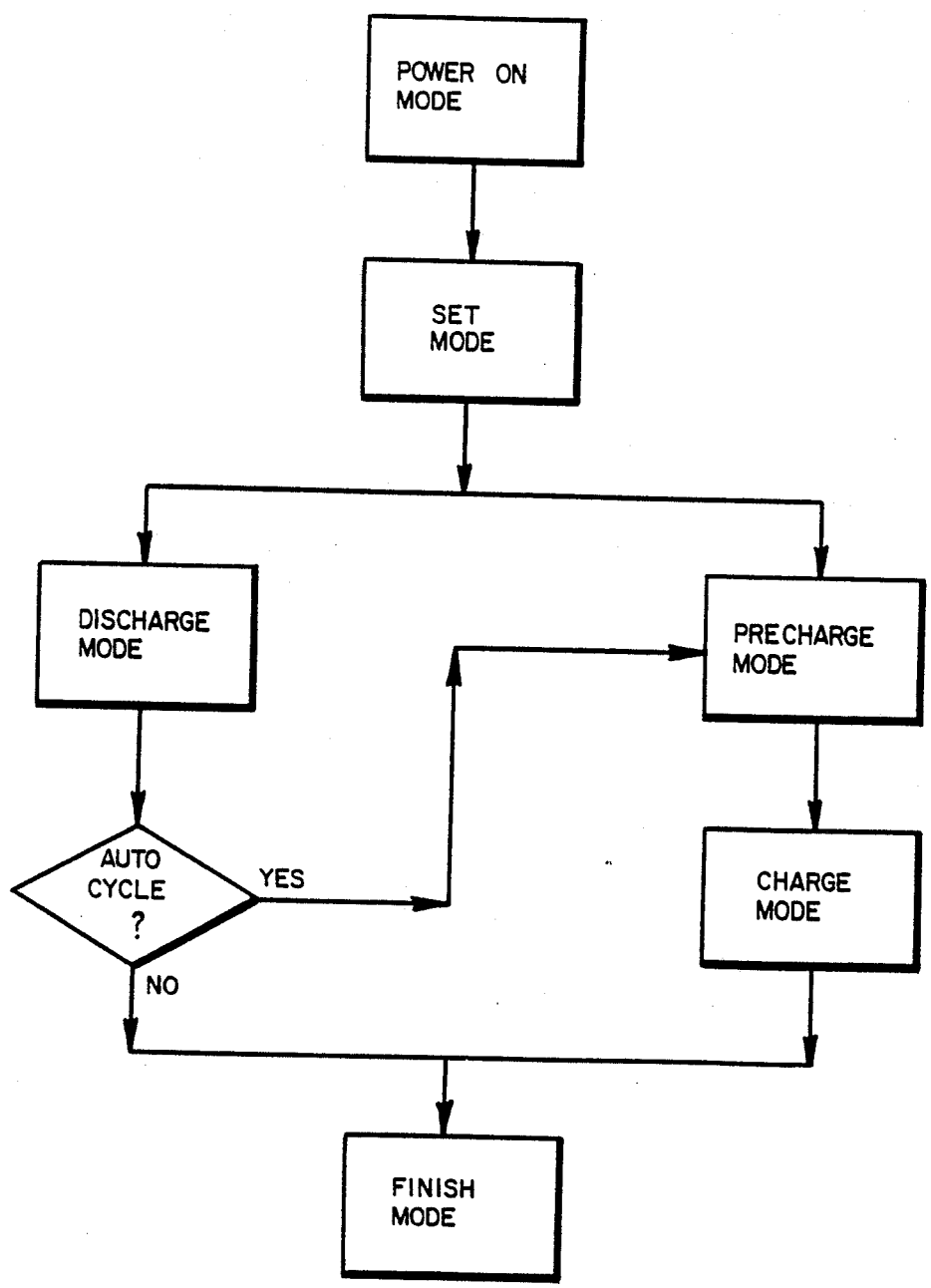
FIG. 5 is a system mode flow diagram, illustrating the general operation of the system.
Figure 6:
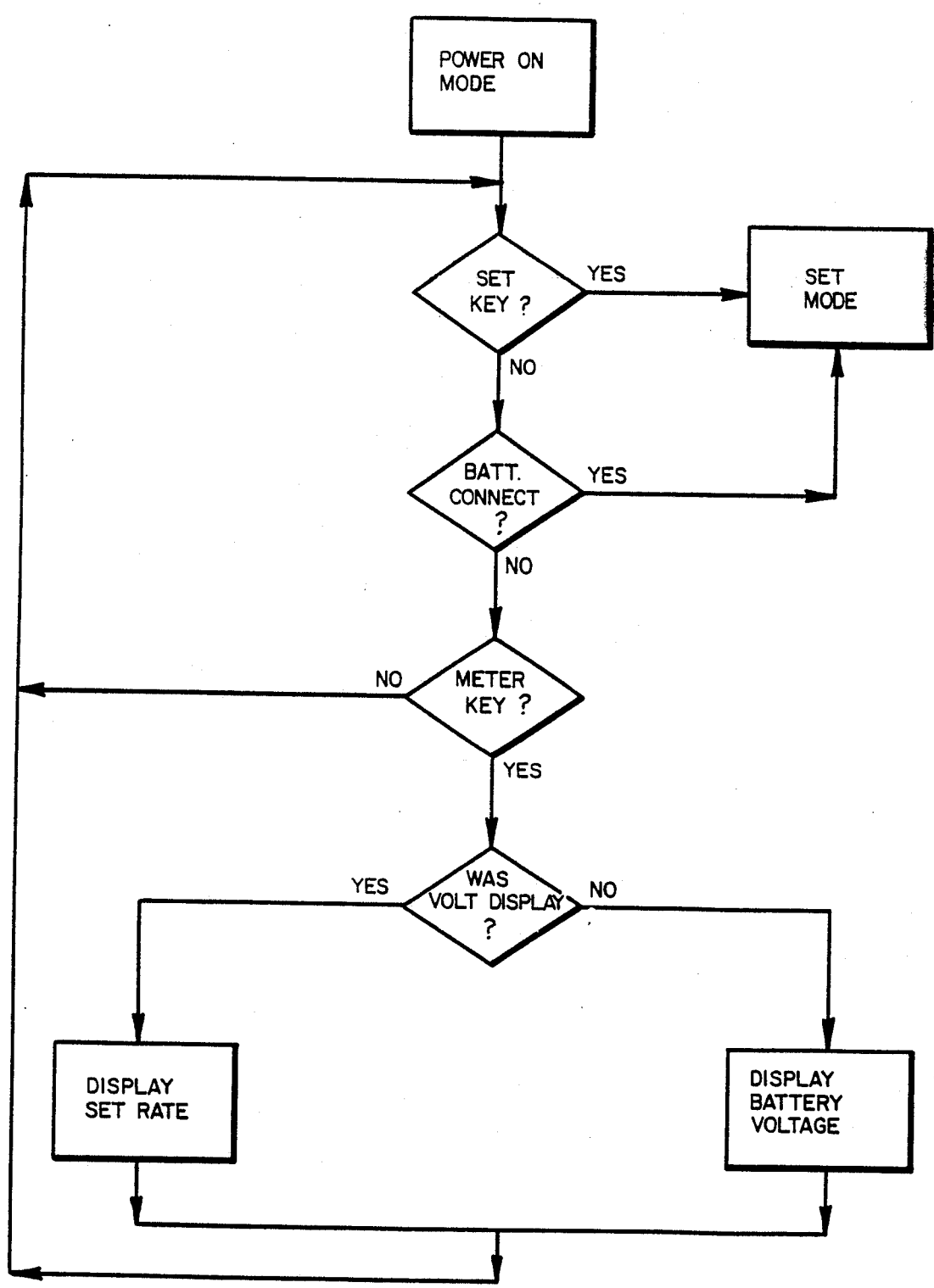
FIG. 6 is a flow diagram illustrating a power-on mode of operation.
Figure 7:
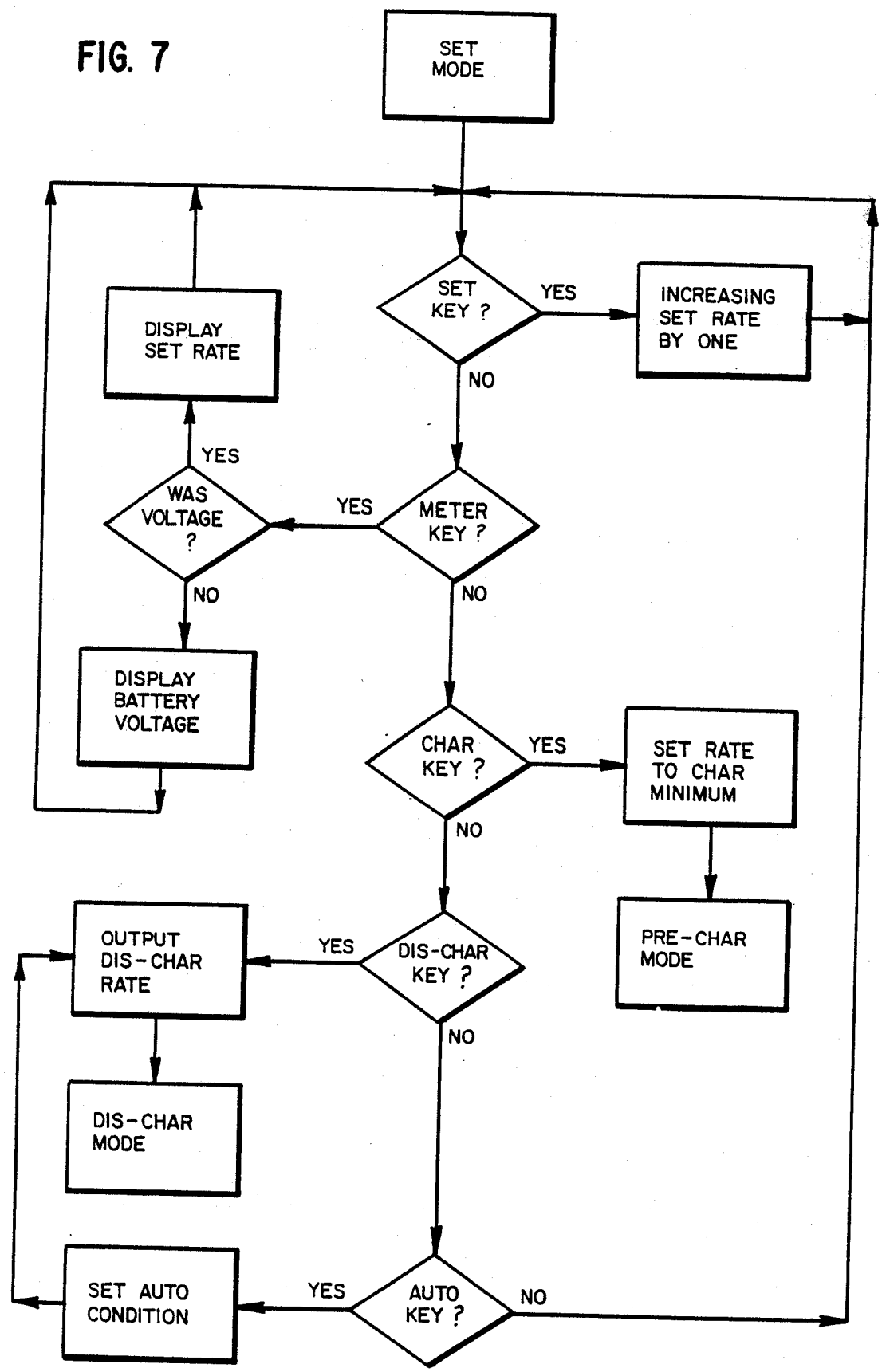
FIG. 7 is a flow diagram illustrating a set mode of operation.
Figure 8:
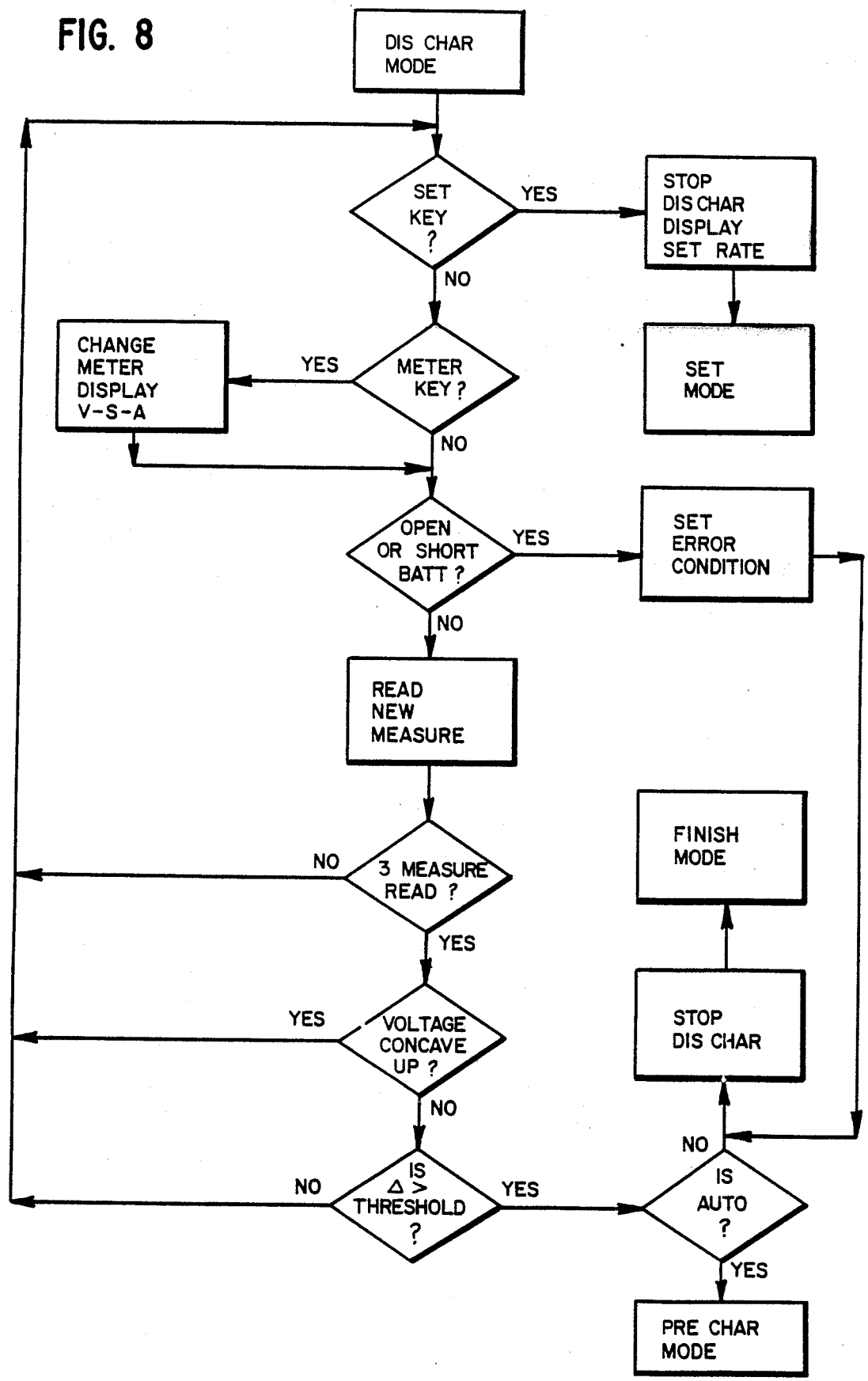
FIG. 8 is a flow diagram illustrating a discharge mode of operation.
Figure 9:
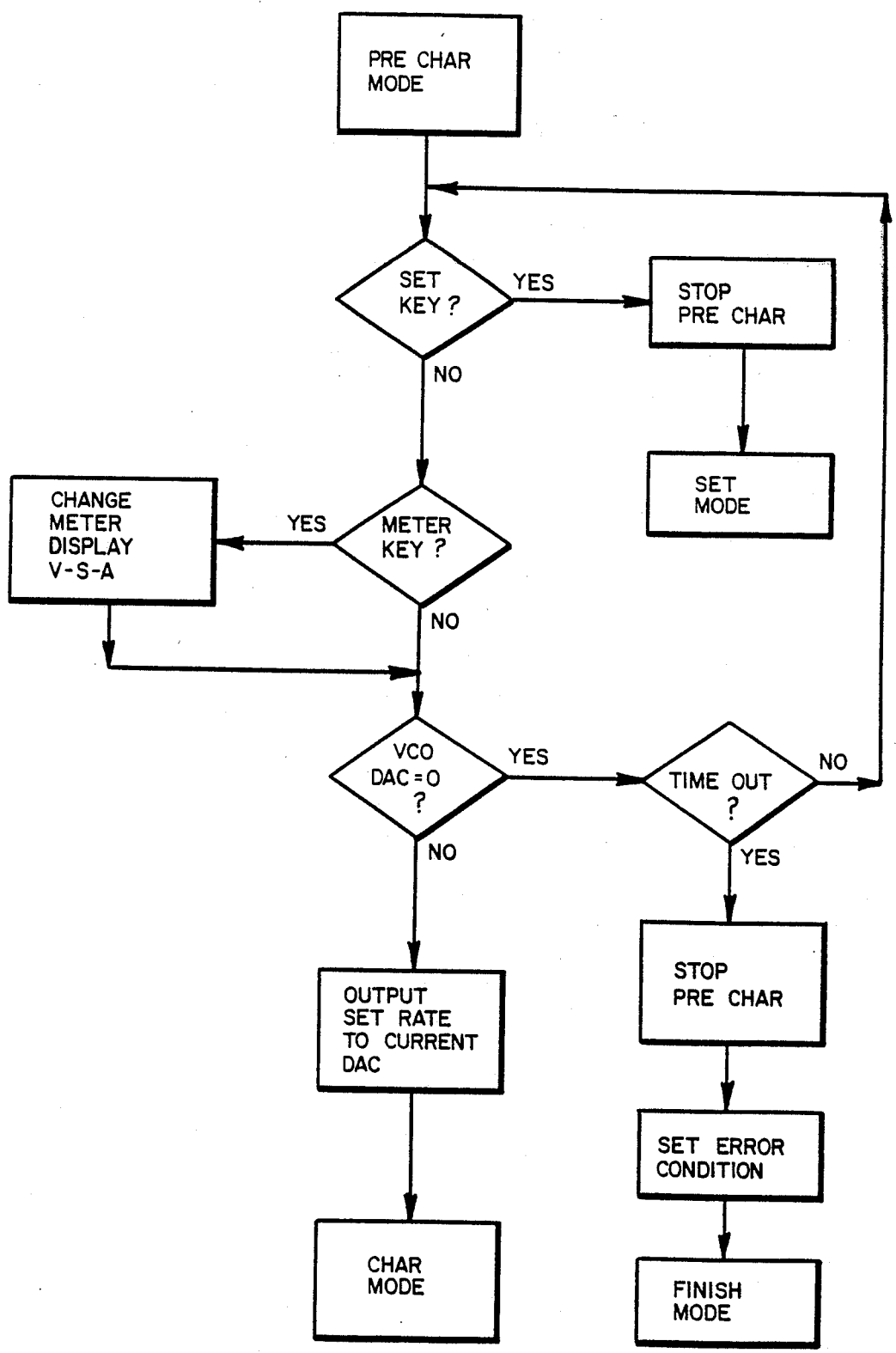
FIG. 9 is a flow diagram illustrating a pre-charge mode of operation.
Figure 10:
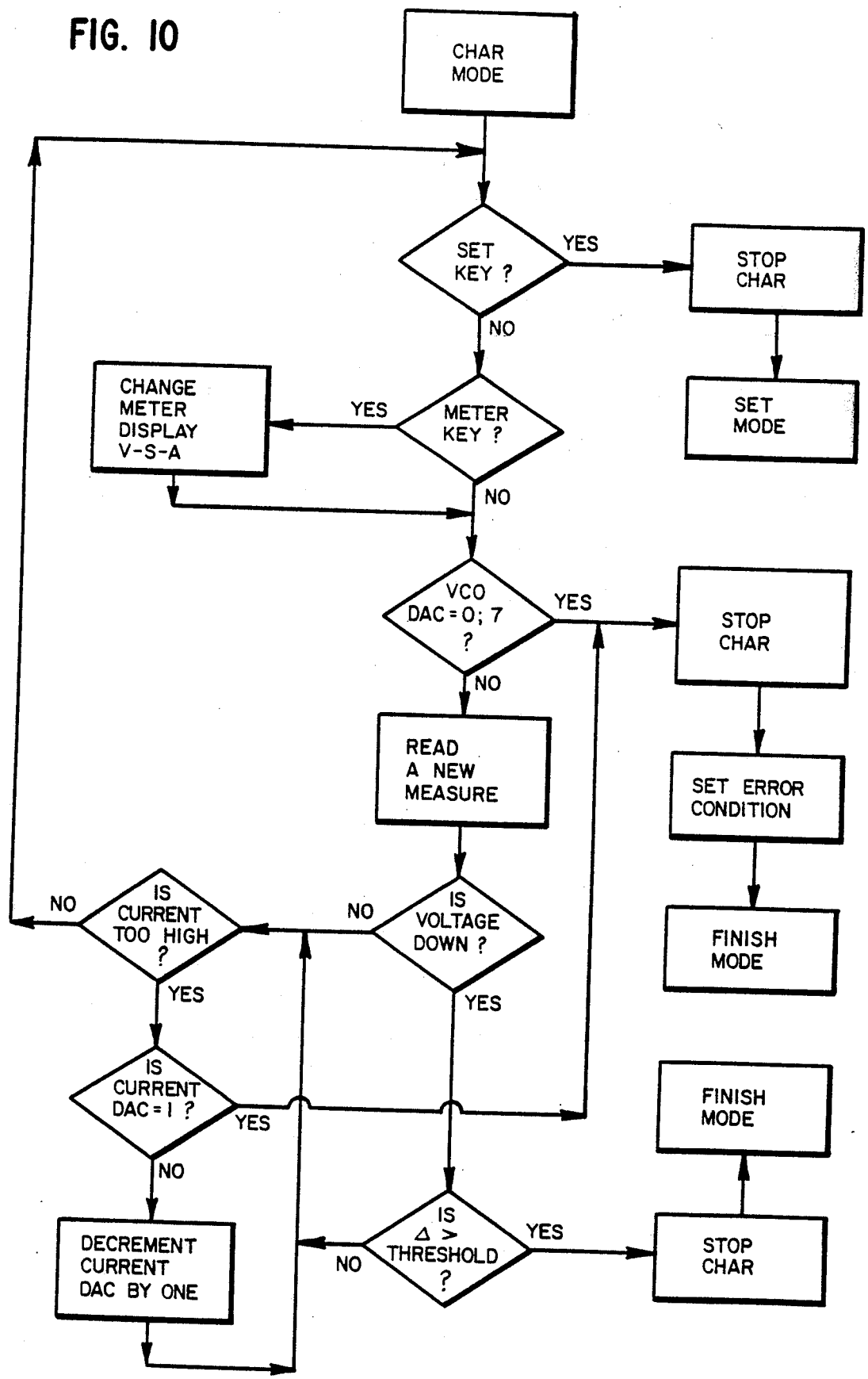
FIG. 10 is a flow diagram illustrating a charge mode of operation.
Figure 11:
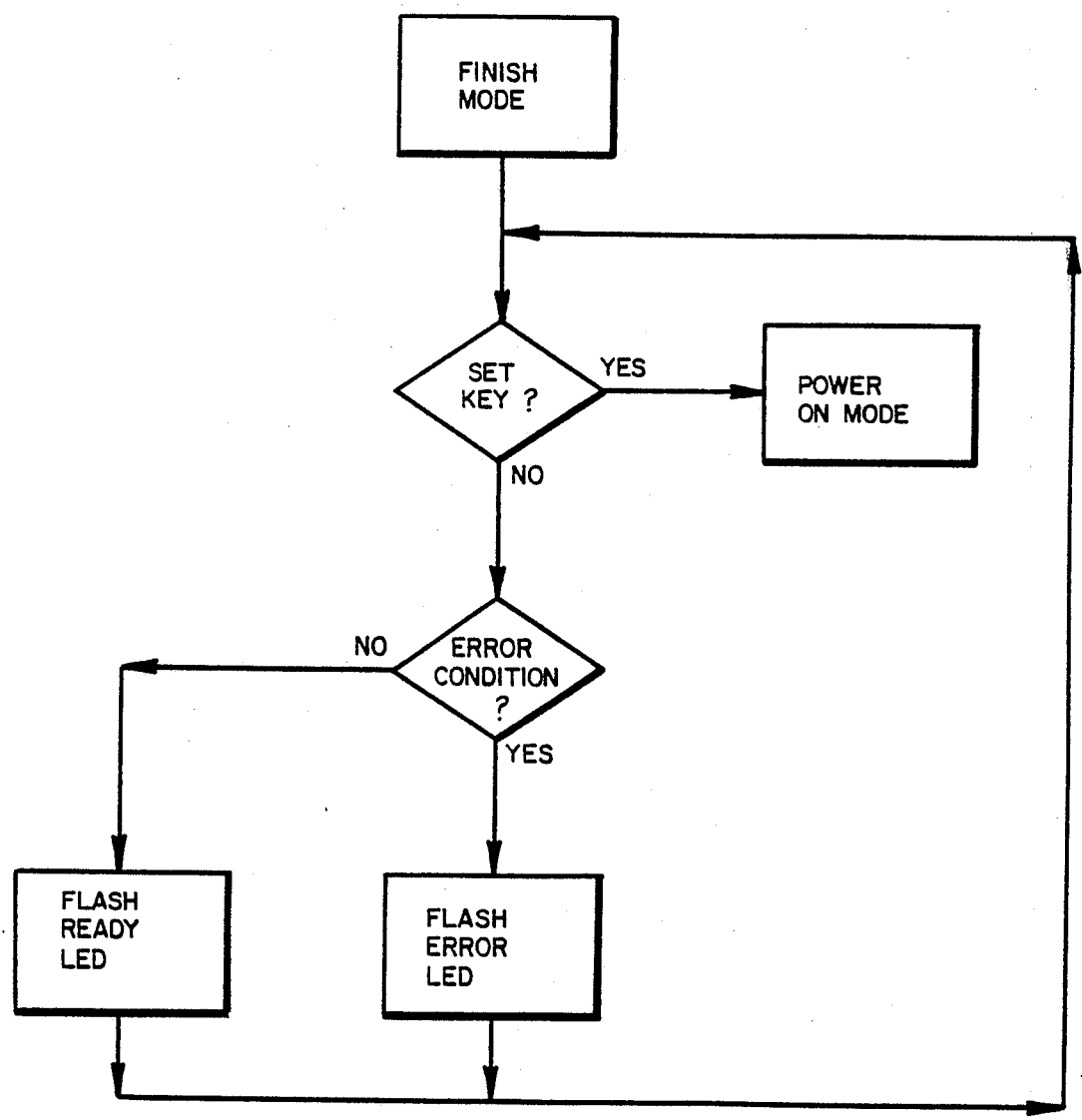
FIG. 11 is a flow diagram illustrating a finish mode of operation.

FIG. 5 shows the overall operation and FIG. 6 shows a power-on mode of operation. FIG. 7 shows how current-setting, display, charge, discharge and autocycle operations are initiated in response to operation of the various keys. FIG. 8 shows a discharge operation performed either in direct response to operation of the discharge key 23 or after a charge operation when the autocycle mode has been initiated by operation of the autocycle key 25. FIG. 9 shows a pre-charge operation which is performed in response to operation of the charge key. If a current measurement shows that the battery will not accept a charge when a low current is applied for a certain time interval, the pre-charge operation is stopped, an error condition is displayed and a finish mode of operation is initiated. If the battery will accept a charge, a high charge current is applied at a set rate and a charge mode of operation of FIG. 10 is initiated. In the charge mode of operation, a determination is made as to whether the voltage has decreased and whether, at the same time, the decrease is more than a threshold digital value which is an octal 10 or decimal 8. If so, the charged operation is stopped and a finish mode of operation of FIG. 11 is initiated.

Figure 12:
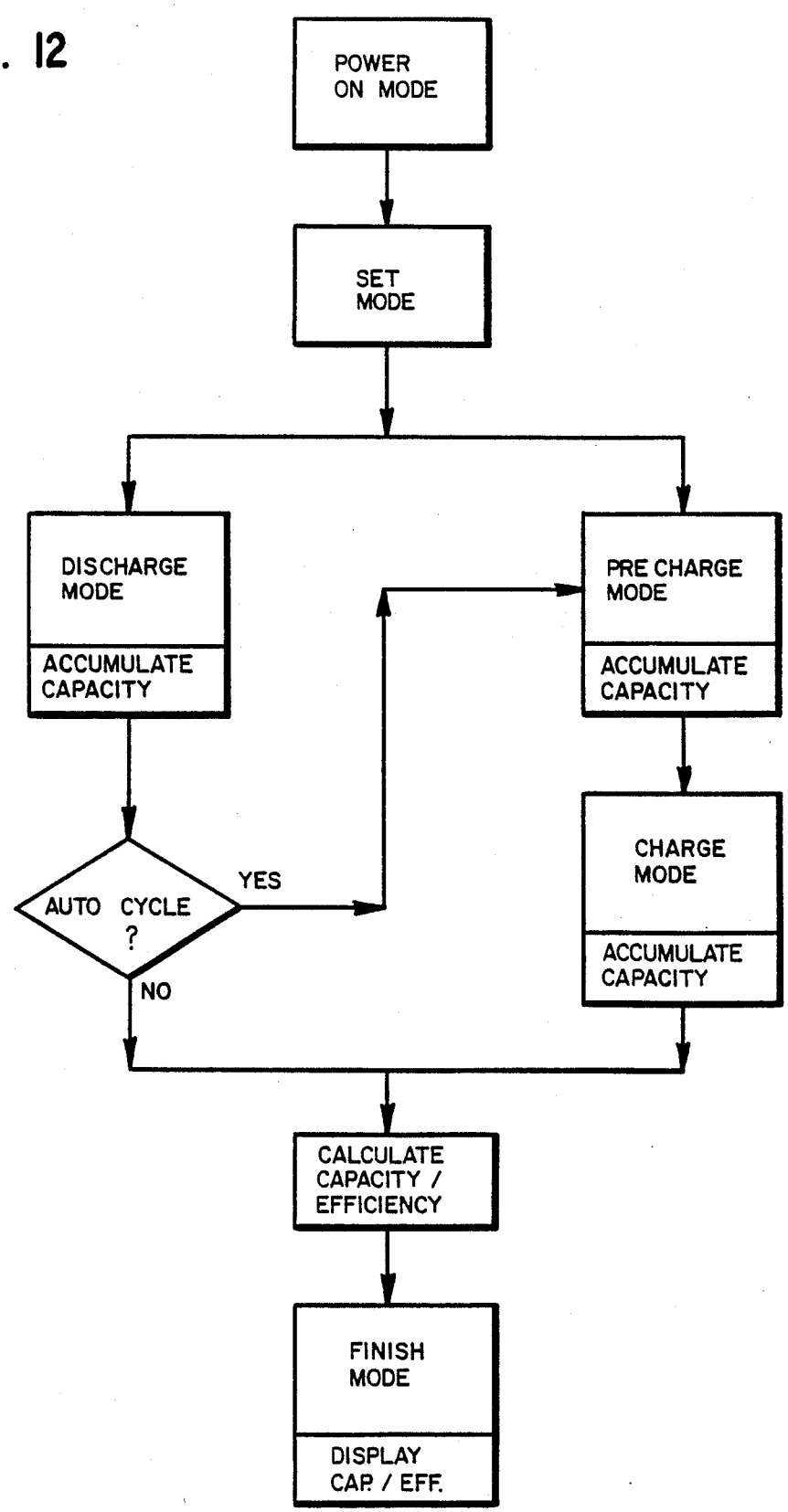
FIG. 12 is a system mode flow diagram similar to FIG. 5 but illustrating a modification in which the capacity and efficiency of a battery are determined in accordance with the invention of this divisional application.
Figure 13:
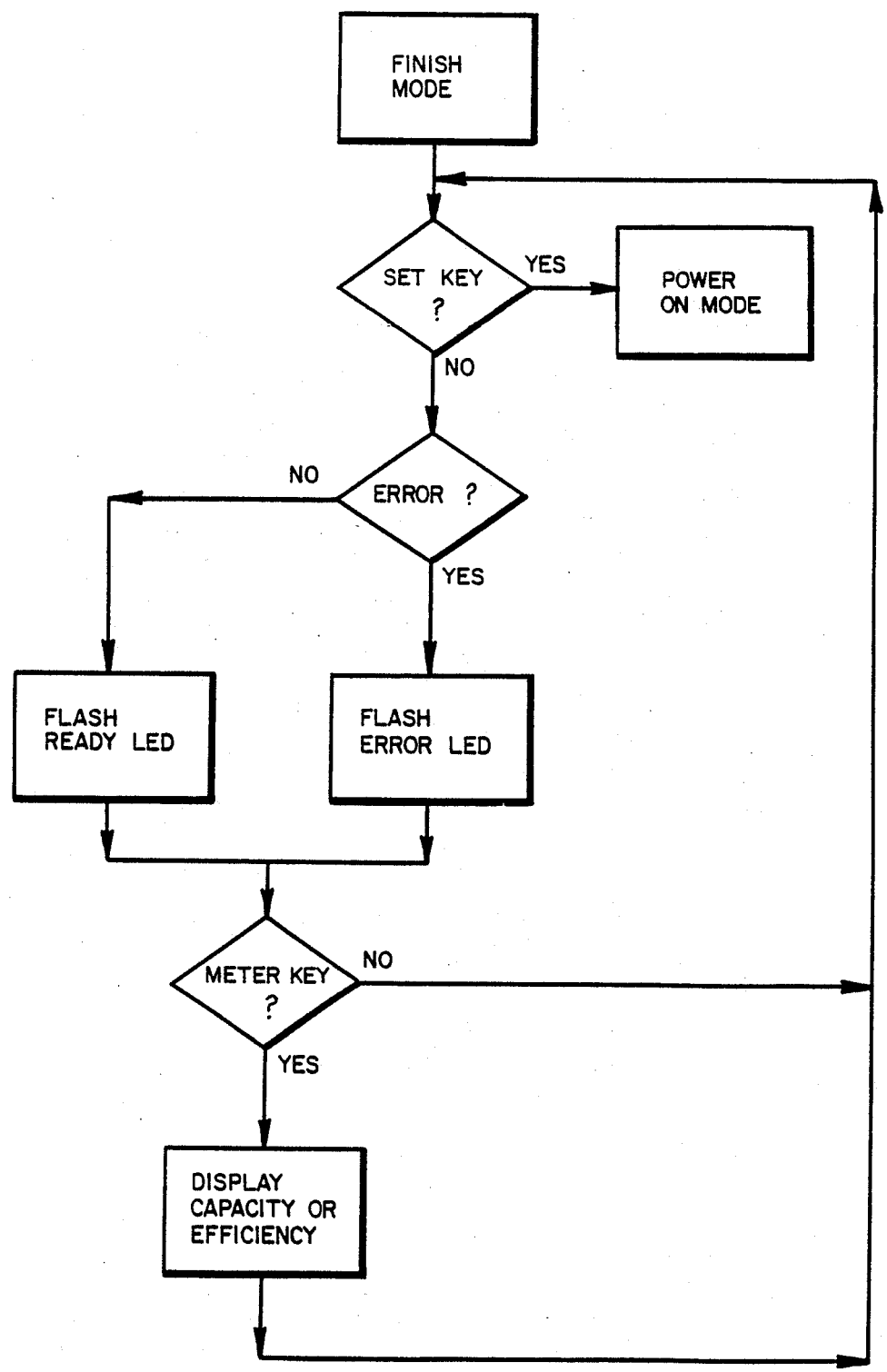
FIG. 13 is a flow diagram similar to FIG. 11 but illustrating a finish mode of operation of the modification of FIG. 12.
Figure 14:
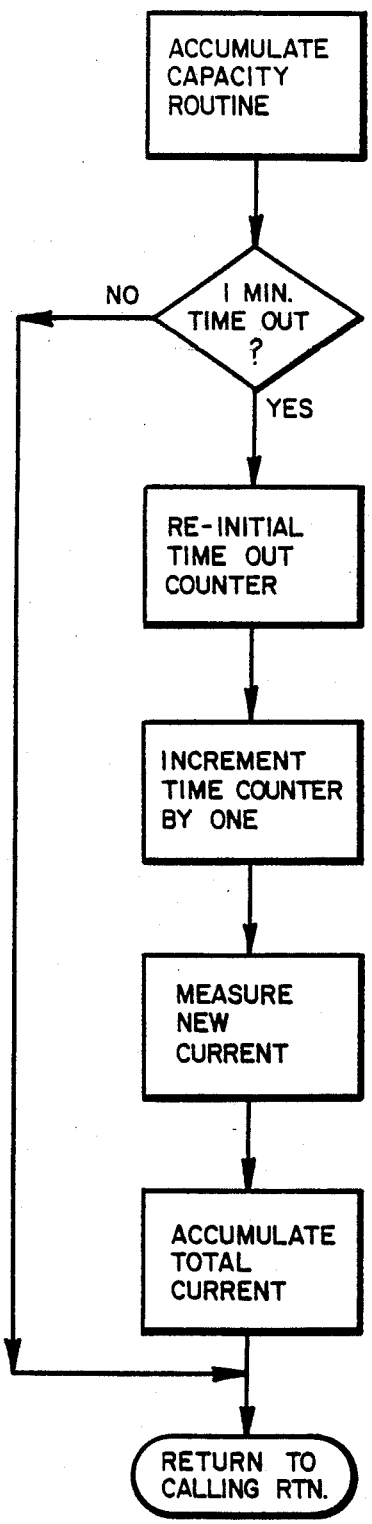
FIG. 14 is a flow diagram illustrating an accumulate capacity routine usable in the modification of FIG. 12.
Figure 15:
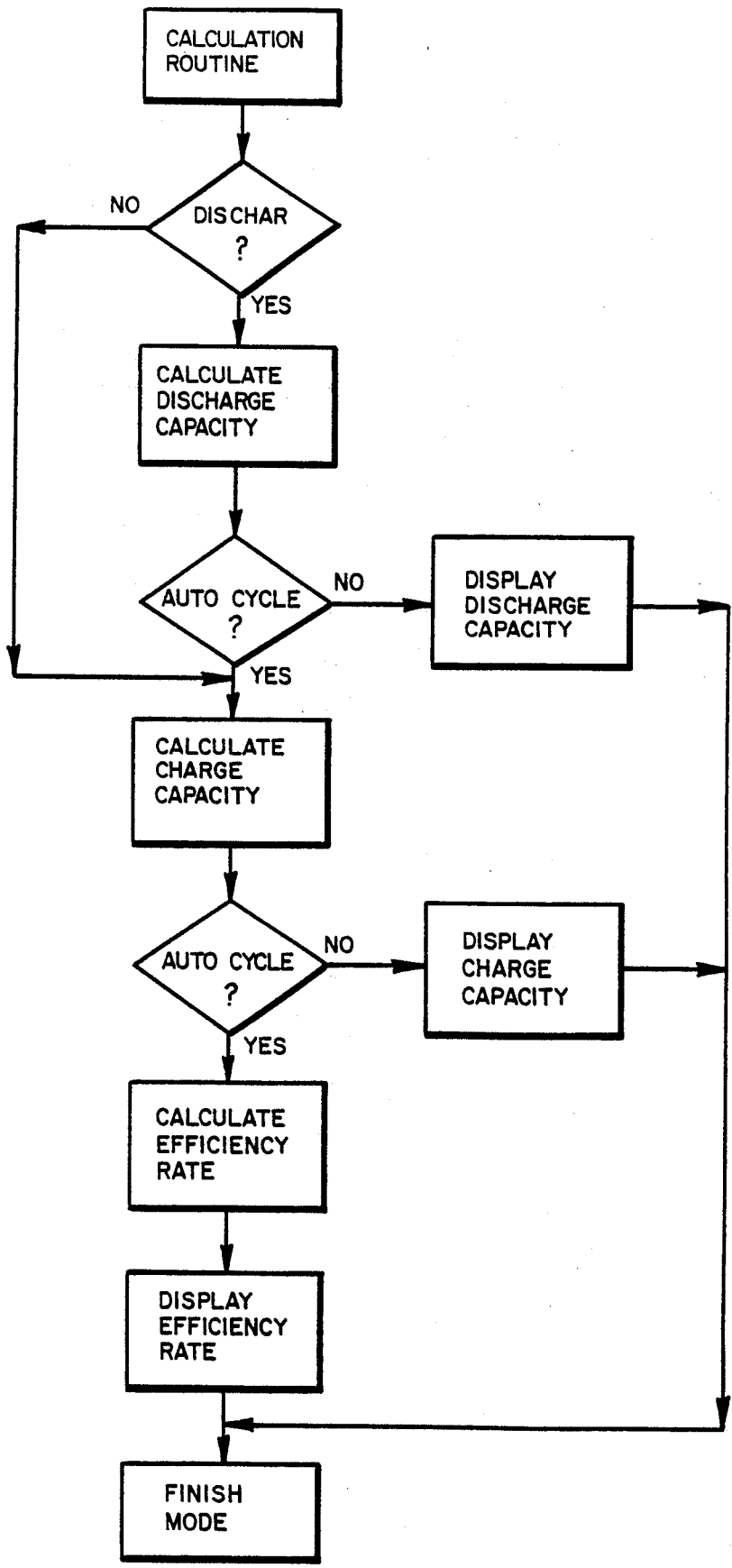
FIG. 15 is a flow diagram illustrating a calculation routine of the modification of FIG. 12.

FIGS. 12, 13, 14 and 15 are flow diagrams illustrating a modified operation which is compatible with and readily added to the operations as depicted in the other flow diagrams. FIG. 12 is a system mode diagram similar to FIG. 5 but showing the addition of accumulate capacity routines to the discharge mode, pre-charge mode and charge mode operations, each accumulate capacity routine being as shown in FIG. 14. A calculation routine as shown in FIG. 15 is performed prior to a finish mode which, as shown in FIG. 13, includes a display of capacity and/or efficiency. As indicated in FIG. 14, a one-minute time-out timer is used in the illustrated system and when the current measurements are in milliamperes, it is necessary to divide the accumulated energy in milliampere-minutes by a conversion factor of 60000 to obtain capacity in ampere hours. It will be understood that the current measurements need not be in milliamperes and that intervals of other than one minute may be used.

The inclusion of the meter 39 is advantageous in providing a check on the operation of the system and also in providing a memo for quickly and reliably determining the existence of shorted cells. The dial of the meter has index marks corresponding to a plurality of equal voltage divisions, each equal to the no-load voltage of one cell of the type of battery to be processed, thereby dividing the dial into contiguous ranges which are indicated by consecutive numbers. If the number of the range indicated by the meter is less than the number of cells of a battery, it indicates the existence of one or more shorted cells.

It is noted that the illustrated embodiment is designed for charging and/or testing of one battery at a time but may be used for simultaneously processing of a number of batteries, using separate series and shunt regulators and using one microprocessor and associated linear circuitry together with multiplexing circuitry for cyclically monitoring all batteries and applying control signals to the series and shunt regulators of such batteries.

It is also noted that in place of the arrangement using a VCO as illustrated, a conventional analog-to-digital converter may be used which may be an "on-board" circuit or the same chips as the microprocessor. In such a modification, it is highly desirable that the ranging amplifier 57 and ladder 58 be retained to obtain high resolution over a wide range without requiring a converter having correspondingly high resolution.

It will be understood that these and other modifications may be made without departing from the spirit and scope of the novel concepts of this invention.

We claim:

1. Control apparatus for battery current control, comprising: battery terminals, current flow control means coupled to said battery terminals for effecting flow of battery current in at least one direction, current-monitoring means and voltage monitoring means coupled to said battery terminals, microprocessor means coupled to said current monitoring means and said voltage monitoring means for register of battery current data and battery voltage data and coupled to said current flow control means to apply control signals thereto, memory means associated with said microprocessor means for storage of registered battery voltage data and for storage of accumulated capacity data, said microprocessor means being arranged to effect a mode of operation in which said accumulated capacity data is set at an initial value and said current flow control means effects flow of battery current and in which monitoring and control operations are thereafter effected periodically, said monitoring and control operations including comparisons of presently registered and stored battery voltage data and further including capacity-determining operations for processing registered battery current data to accumulate capacity data in said memory means.

2. Control apparatus as defined in claim 1, said current flow control means being operative by said microprocessor means in a charge mode and including power supply means and charge means coupling said power supply means to said battery terminals for supplying a charging current to a battery coupled to said battery terminals, said accumulated capacity data including charge capacity data corresponding to the charge capacity of said battery.

3. Control apparatus as defined in claim 1, said current flow control means being operative by said microprocessor means in a discharge mode and including load means and discharge means coupling said load means to said battery terminals for drawing a discharge current from a battery coupled to said battery terminals, said accumulated capacity data including discharge capacity data corresponding to the discharge capacity of said battery.

4. Control apparatus as defined in claim 3, said current flow control means being also operative by said microprocessor means in a charge mode and including power supply means and charging means coupling said power supply means to said battery terminals for supplying a charging current to a battery coupled to said battery terminals, said accumulated capacity data further including charge capacity data corresponding to the charge capacity of said battery.

5. Control apparatus as defined in claim 4, said microprocessor means being operative in an autocycle mode to effect said charge and discharge modes of operation in sequence and to compare said charge and discharge capacity data to provide battery efficiency data.

6. Control apparatus as defined in claim 5, display means arranged for display of numeric data and coupled to said microprocessor means for operation thereby, said microprocessor means being operative in said autocycle mode for display of data which includes said efficiency data.

7. Control apparatus as defined in claim 2, display means arranged for display of numeric data and coupled to said microprocessor means for operation thereby, said microprocessor means being operative in said charge mode for display of data which includes said charge capacity data.

8. Control apparatus as defined in claim 3, display means arranged for display of numeric data and coupled to said microprocessor means for operation thereby, said microprocessor means being operative in said discharge mode for display of data which includes said discharge capacity data.

9. Control apparatus as defined in claim 5, display means arranged for display of numeric data and coupled to said microprocessor means for operation thereby, said microprocessor means being operative in said discharge mode for display of data which includes said discharge capacity data, being operative in said charge mode for display of data which includes said charge capacity data and being operative in said autocycle mode for display of data which includes said battery efficiency data.

10. Control apparatus as defined in claim 1, said capacity determining operations including operations performed periodically at a substantially fixed rate, each such periodically performed operation including the accumulation of said registered battery current data to provide capacity data in the form of accumulated total current.

11. Control apparatus as defined in claim 10, said microprocessor and memory means providing a time counter and a time-out counter, said microprocessor means being operative to operate said time-out counter during said monitoring and control operations and being operative upon a time-out of said time-out counter to re-initialize said time-out counter, increment said time counter, measure a new current and accumulate total current.

12. Control apparatus for battery current control, comprising: battery terminals, power supply means, charge means coupling said power supply means to said battery terminals for supplying a charging current to a battery coupled to said battery terminals, discharge means coupled to said battery terminals for discharging said battery coupled thereto, current monitoring means coupled to said battery terminals and said charge and discharge means, microprocessor means coupled to said current monitoring means for register of battery charging and discharging current, memory means associated with said microprocessor means for storage of data including accumulated capacity data, said microprocessor means being operative to control said charging and discharging means and to effect a plurality of modes of operation including a charge mode in which said charge means is operated, a discharge mode in which said discharge means is operated and an autocycle mode in which said charge and discharge means are sequentially operated, and said microprocessor means being operative in both said charge and discharge modes to effect accumulate-capacity operations and being operative in said autocycle mode to effect an operation to calculate efficiency rate data.

13. Control apparatus as defined in claim 12, wherein said efficiency rate is calculated from the ratio of discharge capacity to charge capacity.

14. Control apparatus as defined in claim 12, display means arranged for display of numeric data and coupled to said microprocessor means for operation thereby, said microprocessor means being operative in said charge mode for display of charge capacity data, being operative in said discharge mode for display of discharge capacity data and being operative in said autocycle mode for display of said efficiency rate data.

* * * * *